Oct. 16, 1962
D. P. RUTTER
3,058,861
METAL JACKETED INSULATION
Filed Oct. 30, 1958
2 Sheets-Sheet 1
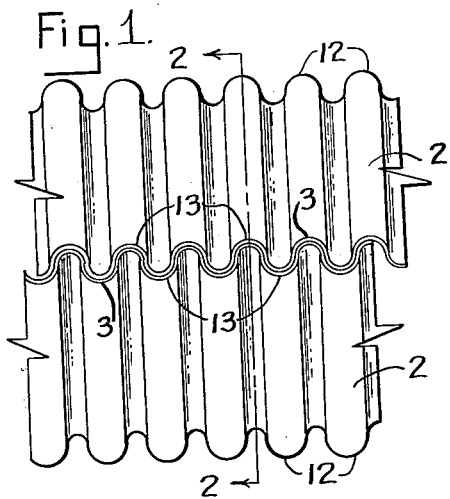
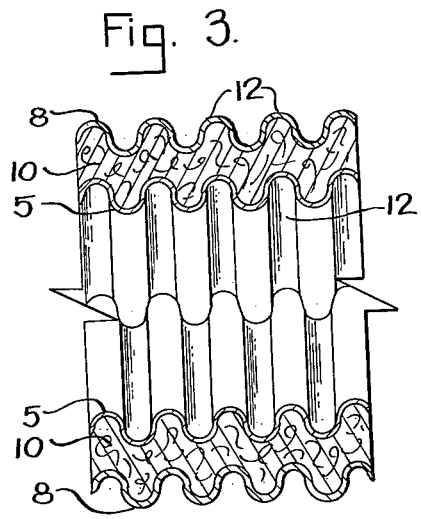
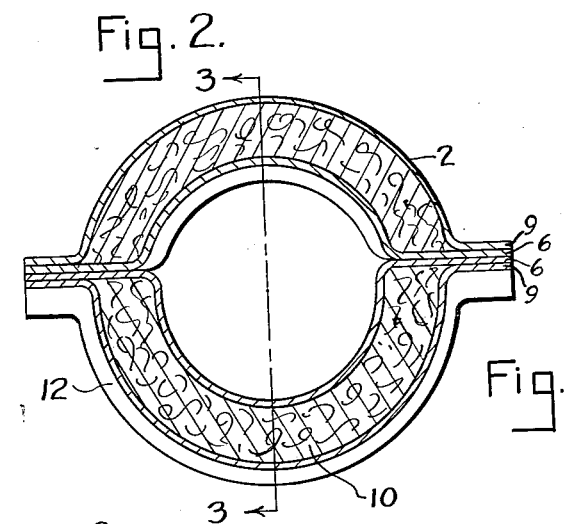
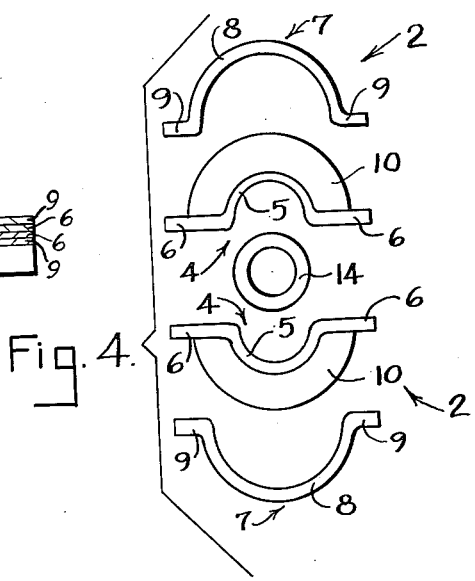
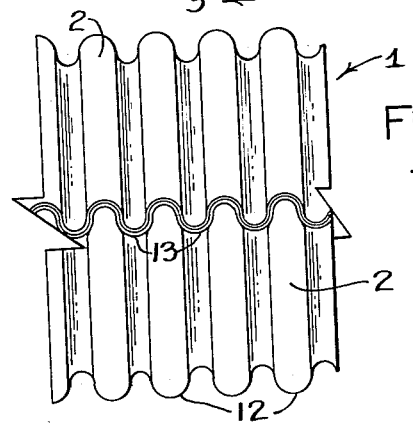
INVENTOR.
DONALD P. RUTTER
BY
John A. McKinney
ATTORNEY

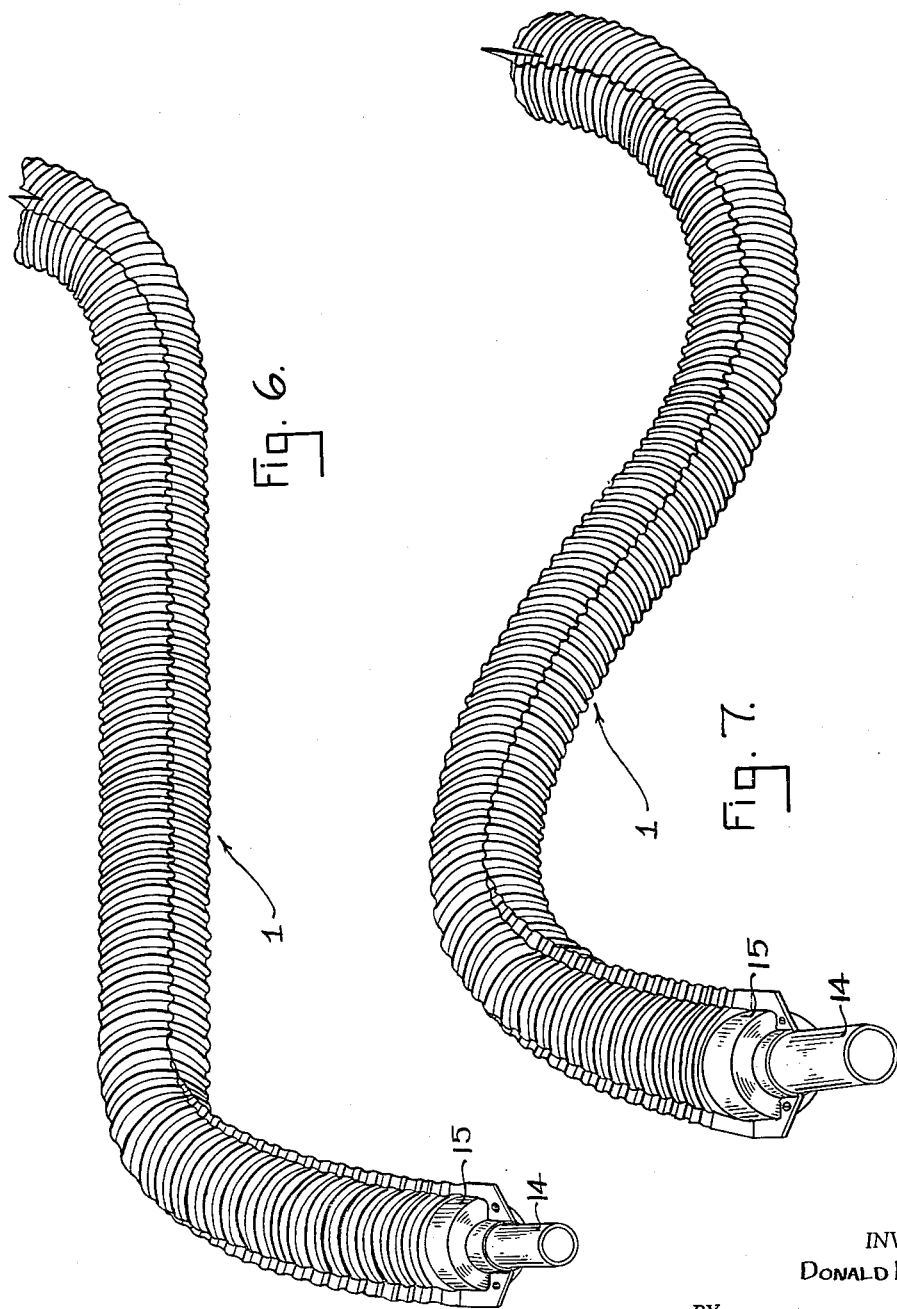

3,058,861
Patented Oct. 16, 1962

3,058,861
METAL JACKETED INSULATION
Donald P. Rutter, Bernardsville, N.J., assignor to Johns-Manville Corporation, New York, N.Y., a corporation of New York
Filed Oct. 30, 1958, Ser. No. 770,863
3 Claims. (Cl. 154—44)

This invention relates to a metal jacketed insulation and is particularly directed to a metal jacketed insulation that is flexible in all planes. The metal jacketed insulation of the instant invention is particularly adapted for use in aircraft hydraulic, fuel, and hot air lines but may be used in any installation wherein a compound curve is to be provided with a metal jacketed insulation.

In many instances, metal jacketed insulations are required for tubing having a plurality of curves. Previous designs for compound-bent tubing were preformed using expensive dies. Flexible metal jacketed insulations were: (1) either hard to make bellows type; or (2) were made in corrugated half sections that would flex only in one plane.

It is an object of this invention to provide a metal jacketed insulation that is flexible in all planes.

The foregoing object is accomplished in accordance with the instant invention by a pair of mating corrugated semi-cylindrical sections having similar corrugated radial end flanges adapted to be joined together in nesting relationship. Each corrugated semi-cylindrical section comprises an inner sheet formed into the desired semi-cylindrical shape and having an inside diameter corresponding to the outside diameter of the tube to be insulated and an outer sheet formed into the desired semi-cylindrical shape and having a diameter determined by the required thickness of the insulation which is positioned between the inner and outer sheet. All of the grooves of the corrugations are substantially of the same pitch and depth and are sufficiently deep to permit axial expansion and contraction without stretching or shrinking the metal gauge. The pitch and depth requirement is necessary since the radial flanges on each sheet must nest: (1) to complete each inclosure; and (2) to provide the joining surface for the pair of semi-cylindrical sections which are mated to provide the metal jacketed insulation which is flexible in all planes so as to conform readily to any compound curve in the tube. The term, flexible in all planes, is used herein to signify that the insulation may be curved at any point in any desired direction. The associated radial flanges in all instances are preferably secured by resistance welding but other means such as wire, adhesives and the like may be employed. If desired the metal jacketed insulation may be positively secured in position on the tube by flattening or crimping the corrugations in the radial end flanges after assembly on the tube.

The invention will be more fully understood and further objects and advantages thereof will become apparent when reference is made to the following detailed description of a preferred embodiment of the invention and the accompanying drawings in which:

FIG. 1 is a view in side elevation of a flexible metal jacketed insulation;

FIG. 2 is a view in section taken on the plane passing through the line 2—2 of FIG. 1;

FIG. 3 is a view in section taken on a plane passing through the line 3—3 of FIG. 2;

FIG. 4 is an exploded view of the components of FIG. 2;

FIG. 5 is a view in side elevation of another form of a flexible metal jacketed insulation; and FIGS. 6 and 7 are pictorial representations of a flexible metal jacketed insulation applied to a tube having a compound curve.

Referring to the drawings and in particular to FIGS. 1–3, there is disclosed the preferred form of a metal jacketed insulation 1 which is flexible in all planes. The metal jacketed insulation applied to a tube having a com-semi-cylindrical sections 2 having radial end flanges 3. Each semi-cylindrical section 2, as particularly illustrated in the exploded view of FIG. 4, has an inner sheet 4 having a semi-cylindrical portion 5 and radial edges or flanges 6 and an outer sheet 7 having a semi-cylindrical portion 8 and radial edges or flanges 9. As illustrated in the drawings the radial edges 9 extend outwardly but it is possible to reverse the direction of the flanges and direct them inwardly toward the semi-cylindrical portion 5 of the inner sheet 4. Insulating material 10 is located between the semi-cylindrical portion 5 of the inner sheet 4 and semi-cylindrical portion 8 of the outer sheet 7.

Each sheet 4 and 7 is provided with a plurality of transversely extending arched corrugations 12 in the semi-cylindrical portions 5 and 8 and similar arched corrugations 13 in the radial edges 6 and 9. The corrugations 12 and 13 are all substantially of the same pitch and depth and are sufficiently deep to permit axial expansion and contraction without shrinking the metal gauge. In assembling the semi-cylindrical sections 2, the radial edges 6 and 9 are brought into nesting engagement with the insulating material 10 between the semi-cylindrical portions 5 and 8. The radial edges 6 and 9 are secured in nesting relationship by resistance welding. The inside diameter of the inner semi-cylindrical portion 5 corresponds to the outside diameter of the tube 14 for which it is adapted and the inside diameter of the semi-cylindrical portion 8 is determined by the required thickness of the insulating material 10.

The corrugations 12 in the associated inner and outer sheets 4 and 7 are in phase with each other so that a transverse plane passing through the longitudinal axes of the semi-cylindrical portions 5 and 8 are perpendicularly intersecting the edges 6 and 9 will intercept corresponding sections of a land or valley in the corrugations of the sheets 4 and 7. The corrugations 12 in the mating semi-cylindrical sections 2 forming the flexible metal jacketed insulation 1 may be 180° out of phase, as in the preferred embodiment illustrated in FIG. 1, or be in phase as illustrated in FIG. 5. The corrugations 13 in the radial edges 6 and 9 of the lower semi-cylindrical sections 2 illustrated in FIG. 5 are 180° out of phase with the corrugations 12 in the corresponding semi-cylindrical parts 5 and 8 thereof so that when the radial flanges 3 of the mating semi-cylindrical sections 2 illustrated in FIG. 5 are nested within each other, the lands in the semi-cylindrical sections 2 are directly opposite each other.

In FIGS. 6 and 7 there is illustrated a flexible metal jacketed insulation 1 in position around sections of tubing 14 having compound curves formed therein. The corrugations 12 in the semi-cylindrical portions 5 and 8 and the corrugations 13 in the radial edges 6 and 9 allow the flexible metal jacketed insulation to be flexible in all planes. The metal jacketed insulation 1 is placed in position around the tubing 14 by inserting one end of the tubing 14 into the cylindrical portion formed by the two mating semi-cylindrical sections 2 and then slid over the tube 14 into final position. The metal jacketed insulation 1 readily follows the compound curves in the tubing 14 and may be positively secured in the desired position on the tubing 14 by crimping the corrugations 13 in the radial end flanges 3. End caps 15 are secured to the insulations 1.

In accordance with the instant invention, a flexible metal jacketed insulation 1 was constructed in which the sheets 4 and 7 were of stainless steel, .004" thick and had a sinusoidal corrugated pattern formed therein in which the grooves were 3/32" deep and had a 3/16" pitch. The semi-cylindrical portions 5 had an inside diameter of 1/2" and the semi-cylindrical portions 8 had an inside diameter of 1". A standard 1/2" thick mineral wool felt was inserted between the semi-cylindrical portions 5 and 8 and was compressed to 1/4" when the radial edges 6 and 9 were brought into nesting relationship and secured therein by resistance welding. The semi-cylindrical sections 2 thus formed were then assembled with the radial flanges 3 in nesting engagement as shown in FIG. 1 and secured therein by resistance welding. The resulting tubular insulation was flexible in all planes.

The above description is given for illustration purposes only and it is not intended to limit the invention thereto. The flexible metal jacketed insulation 1 may be made in any variety of sizes and from different types of material. The thickness of the insulation is dependent upon the type used and the desired insulating characteristics and per se is not considered inventive.

The invention has thus been described in rather full detail, but it will be understood that these details need not be strictly adhered to and that various changes and modifications may suggest themselves to one skilled in the art, all falling within the scope of the invention as defined by the subjoined claims.

What I claim is:

1. A metal jacketed insulation for tubes having compound curves formed therein and wherein said metal jacketer insulaton is flexible in all planes so as to be conformable to the tube to be insulated comprising at least a pair of arcuate sections comprising a thin gauge sheet metal, each of said arcuate sections having a plurality of spaced generally concentric arcuate portions comprising an inner sheet having an arcuate portion formed therein and an outer sheet having an arcuate portion formed therein, each of said inner and outer arcuate portions having integral edges extending in a generally radial direction formed thereon, said inner and outer sheets being joined together along said edges to form generally longitudinally extending end flanges for said arcuate sections, an insulating medium enclosed between said inner and outer arcuate portions, corrugations formed in said arcuate portions and said edges, said arcuate sections being brought together with the corrugations of adjacent ones of said end flanges in nesting relationship to form a tube, each of said arcuate portions and said edges being integral throughout the longitudinal extent of said tube, said corrugations extending generally transversely of the longitudinal axis of said tube, said corrugations in said arcuate portions and said edges allowing said tube to be flexible in all planes, and means joining said nesting radially extending end flanges to each other.

2. A metal jacketed insulation for tubes having compound curves formed therein and wherein said metal jacketed insulation is flexible in all planes so as to be conformable to the tube to be insulated comprising a pair of semi-cylindrical sections comprising a thin gauge sheet metal, each of said semi-cylindrical sections having a plurality of spaced generally concentric semi-cylindrical portions comprising an inner sheet having a semi-cylindrical portion formed therein and an outer sheet having a semi-cylindrical portion formed therein, each of said inner and outer semi-cylindrical portions having integral edges extending in a generally radial direction formed thereon, said inner and outer sheets being joined together along said edges to form generally longitudinally extending end flanges for said semi-cylindrical sections, an insulating medium enclosed between said inner and outer semi-cylindrical portions, corrugations formed in said semi-cylindrical portions and said edges, said semi-cylindrical sections being brought together with the corrugations of adjacent ones of said end flanges in nesting relationship to form a tube, each of said semi-cylindrical portions and said edges being integral throughout the longitudinal extent of said tube, said corrugations extending generally transversely of the longitudinal axis of said tube, said corrugations in said semi-cylindrical portions and said edges allowing said tube to be flexible in all planes, and means joining said nesting end flanges to each other.

3. A metal jacketed insulation for tubes having compound curves formed therein and wherein said metal jacketed insulation is flexible in all planes so as to be conformable to the tube to be insulated comprising a pair of semi-cylindrical sections comprising a thin gauge sheet metal, each of said semi-cylindrical sections having a plurality of spaced generally concentric semi-cylindrical portions comprising an inner sheet having a semi-cylindrical portion formed therein and an outer sheet having a semi-cylindrical portion formed therein, each of said inner and outer semi-cylindrical portions having integral edges extending in a generally radial direction formed thereon, said inner and outer sheets being joined together along said edges to form generally longitudinally extending end flanges for said semi-cylindrical sections, and an insulating medium enclosed between said generally concentric semi-cylindrical portions, corrugations formed in said semi-cylindrical portions and said edges, said semi-cylindrical sections being brought together with the corrugations of adjacent ones of said end flanges in nesting relationship to form a tube, each of said semi-cylindrical portions and said edges being integral throughout the longitudinal extent of said tube, said corrugations extending generally transversely of the longitudinal axis of said tube, said corrugations in said semi-cylindrical portions and said edges allowing said tube to be flexible in all planes, and means joining said nesting end flanges to each other.

References Cited in the file of this patent

UNITED STATES PATENTS

| | | |
|---|---|---|
| 762,178 | MacFayden | June 7, 1904 |
| 926,423 | Kelley | June 29, 1909 |
| 1,268,745 | Martin | June 4, 1918 |
| 1,971,595 | Booth | Aug. 28, 1934 |
| 1,995,446 | Blake | Mar. 26, 1935 |
| 2,817,363 | Penrose | Dec. 24, 1957 |

FOREIGN PATENTS

| | | |
|---|---|---|
| 710,108 | Germany | Sept. 4, 1941 |
| 299,819 | Switzerland | Sept. 1, 1954 |

UNITED STATES PATENT OFFICE
CERTIFICATE OF CORRECTION

Patent No. 3,058,861                      October 16, 1962

Donald P. Rutter

It is hereby certified that error appears in the above numbered patent requiring correction and that the said Letters Patent should read as corrected below.

Column 2, line 6, for "metal jacketed insulation applied to a tube having a com-" read -- metal jacketed insulation 1 consists of a pair of mating --; column 3, lines 30 and 31, for "jacketer" read -- jacketed --.

Signed and sealed this 26th day of March 1963.

(SEAL)
Attest:

ESTON G. JOHNSON
Attesting Officer

DAVID L. LADD
Commissioner of Patents